July 7, 1936.                H. BREDTSCHNEIDER                2,046,999
                                  ARC WELDING
                             Filed Sept. 28, 1934
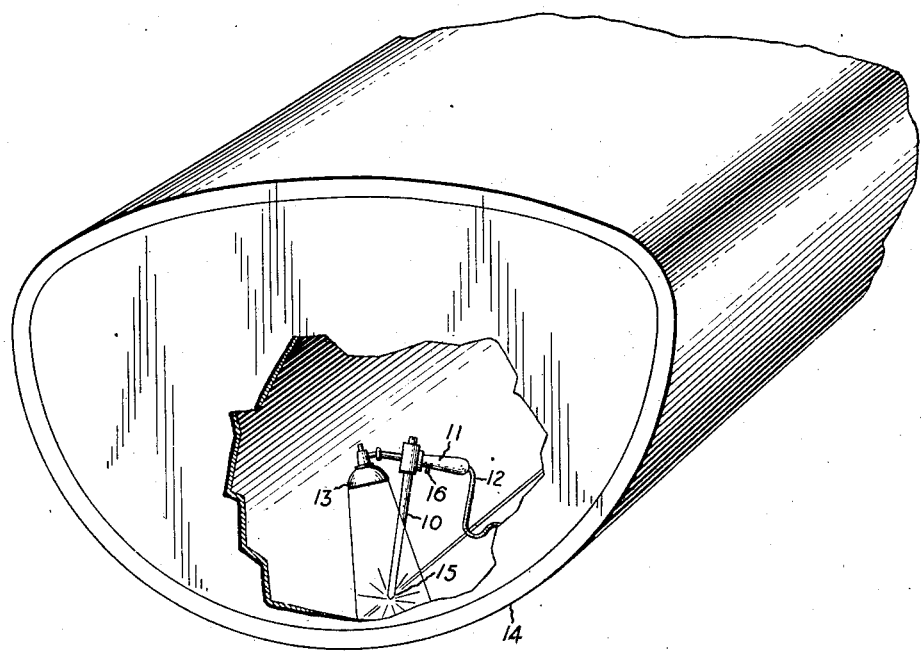
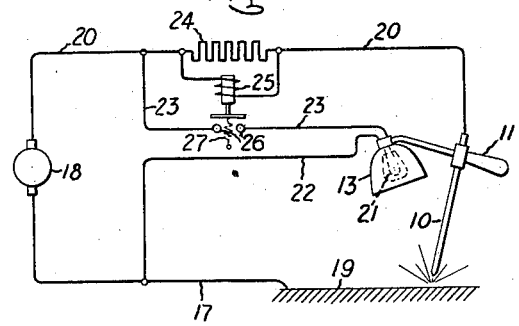
Inventor:
Hans Bredtschneider,
by  Harry E. Dunham
      His Attorney Patented July 7, 1936

2,046,999

UNITED STATES PATENT OFFICE 2,046,999

ARC WELDING

Hans Bredtschneider, Kassel, Germany, assignor to General Electric Company, a corporation of New York Application September 28, 1934, Serial No. 745,984
In Germany October 10, 1933

3 Claims. (Cl. 240—2)

My invention relates to arc welding.

Due to the extremely high temperature of a welding arc, the light given out by the arc is intensely brilliant. Furthermore it contains a large proportion of ultra-violet radiation. This type of radiation is chemically active and will cause painful, although not necessarily permanent, injury to human eyes and skin. It is customary, therefore, for an arc welding operator to protect his head with a helmet or face shield which is provided with a window of protective glass through which he views the welding operation. The protective glasses employed in such face shields and helmets, in order to cut down the amount of light transmitted to the eyes of the operator during welding, are so opaque that it is impossible for the welder to view the work upon which he is performing a welding operation when the arc is extinguished. Heretofore, before initiating a welding operation, the operator has displaced his shield or raised his helmet in order to arrange the work parts and to place his electrode in proximity to the point at which he desires to initiate the welding operation. He then replaced the helmet or face shield over his face, struck the arc and proceeded to weld. Such a procedure resulted quite frequently in imperfect welds resulting from false starts. Furthermore, since the operator found it necessary to uncover his eyes at the beginning of the welding operation, it frequently happened that his eyes were exposed to the action of the arc for brief periods of time, which caused painful physical injuries to the eye, for example, conjunctivitis.

It is an object of my invention to provide welding apparatus by means of which the above disadvantages are eliminated.

In accordance with my invention the work is illuminated at the point of welding at an intensity approximately equal to that produced by the welding arc during welding by an independent light source which is preferably mounted on the electrode holder used by the operator in performing his welding operation. I have also provided, in accordance with my invention, means responsive to the ignition of the welding arc, for rendering this auxiliary illuminating means ineffective and responsive to the extinction of the welding arc for rendering this illuminating means effective.

My invention will be better understood from a consideration of the embodiments illustrated in the attached drawing, Fig. 1 of which shows one embodiment of my invention in which the illuminating means is under the control of the welding operator, and Fig. 2 of which shows another embodiment in which the control of the illuminating means is automatic.

In the arrangement illustrated in Fig. 1, the welding electrode 10 is supported in a holder 11 to which welding current is supplied through a cable 12. Means 13 are supported on the electrode holder for illuminating the work 14 at the point of welding 15. The construction of the illuminating means is such that the work at the point of welding is illuminated at approximately the same intensity as it is during welding when the welding arc is ignited. This illuminating means may comprise an incandescent lamp or an arc lamp and suitable reflectors or lenses for directing the light on to the work. In the arrangement illustrated, the illuminating means is an electric light source receiving its supply of energy through the cable 12. In the arrangement illustrated, the connection of the light source to its source of supply is under the control of the welder who, by operating a switch 16 located in the handle of the electrode holder 11, may ignite or extinguish it at will.

In the arrangement illustrated in Fig. 2, the illuminating means is automatically controlled and is energized as long as the welding electrode is not in arcing engagement with the work. The electrode 10 there illustrated is supported in an electrode holder 11 as in Fig. 1. One terminal 17 of the welding generator 18 is connected to the work 19 and the other terminal of the generator 18 is connected through a conductor 20 to the electrode clamp of the holder 11. The electric light source 21 supplied on the holder 11 is connected through conductors 22 and 23 to the welding generator 18. It may be connected to any suitable source, however. In the arrangement illustrated, the generator 18 is a constant potential machine and the desired welding characteristics are obtained by means of a series resistance 24 inserted in the welding circuit. Connected across this resistor 24 is a relay 25 whose contacts 26 are biased to the closed position by a spring 27 when its operating coil is not energized by reason of the flow of current through the welding circuit 17, 20. The relay 25 may be placed directly in the welding circuit but I prefer to place it in shunt with the resistance 24 in that circuit.

The system of Fig. 2 operates as follows:

When the electrode 10 is in arcing engagement with the work 19 as illustrated, the relay 25 is sufficiently energized to separate its contacts 26 and thereby interrupt the flow of electric current to the light source 21 through conductors 22, 23. As soon as the welding arc is extinguished, however, the relay 25 is deenergized and its contacts 26 are closed under the action of spring 27, thereby completing the energizing circuit of the light source 21 which is preferably of such a characteristic as to illuminate the work at the point of welding at an intensity approximately equal to that produced by the welding arc. By employing a light source of such intensity, the operator need not remove his helmet or face shield to view the work upon which he is performing a welding operation when for any reason the welding arc is extinguished. Thus, no time is lost during welding by the operator removing and replacing his welding helmet or face shield, and furthermore, the eyes of the welding operator are at no time exposed to the injurious effects of the light rays of the welding arc. The illuminating means employed may be suitably shielded so that the eyes of the operator are not exposed to the direct rays emanating therefrom and in this way, when welding in dark places such as bunkers (Fig. 1), boilers and the like, the operator can with safety remove his helmet or face shield when no welding operation is being performed to view the work parts prior to initiating his welding operation or for supplying a new electrode to his holder, although this latter operation may, due to the light source, be performed without removing his helmet or face shield.

The illuminating means above referred to may be of any suitable type, and is not necessarily an electrical means such as specifically described. Furthermore, the control for igniting and extinguishing the illuminating means may be of any character so long as it functions to ignite the illuminating means as long as the welding electrode is not in arcing engagement with the work. Thus for example, instead of the current responsive means illustrated in Fig. 2, a voltage responsive means may be employed. This voltage responsive means could, for example, be connected across the welding arc and function to ignite the illuminating means when the welding arc is not ignited and to extinguish the illuminating means as soon as the welding arc has been established. The equivalency of such voltage and current controls are well known and further illustration or description is considered unnecessary.

Many changes may be made in the embodiment illustrated and described without departing from the spirit and scope of my invention. Thus, although I have shown and described two embodiments of my invention, it is to be understood that the same is susceptible to various changes and I reserve the right to employ such changes as may come within the scope of the claims hereto annexed.

What I claim as new and desire to secure by Letters Patent of the United States is:

1. Apparatus enabling an arc welding operator to work without removing his eye shield to view the work when the welding arc is extinguished, said apparatus comprising means for illuminating the work at the point of welding at an intensity approximately equal to that produced by the welding arc during welding, and means accessible to the operator at the point of welding for controlling said illuminating means.

2. An electrode holder for use in arc welding operations comprising an electrode clamp, means for supplying welding current to an electrode supported in said clamp, means mounted on said holder for illuminating the work at the point of welding at an intensity approximately equal to that produced by the welding arc during welding, and means forming a part of said electrode holder for controlling said last mentioned means.

3. Arc welding apparatus comprising an electrode holder, means for supplying welding current to an electrode supported in said holder, means for illuminating the work at the point of welding at an intensity approximately equal to that produced by the welding arc during welding, and means responsive to the ignition of the welding arc for extinguishing said illuminating means and to the extinction of said arc for igniting said illuminating means.

HANS BREDTSCHNEIDER.